Oct. 12, 1926.  1,602,574
G. DEGENRING
AUTOMOBILE TIRE
Filed Nov. 2, 1925
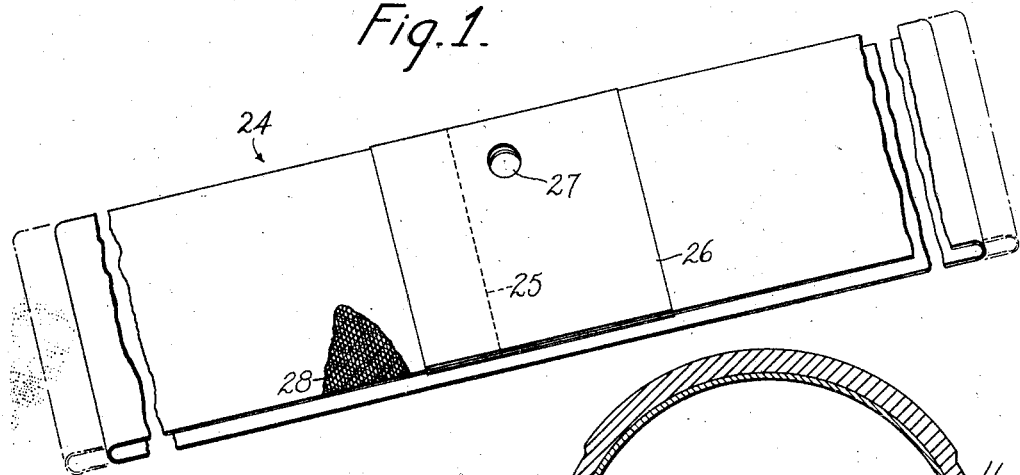
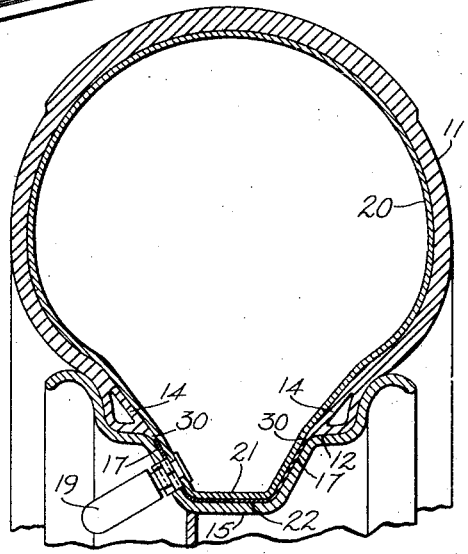
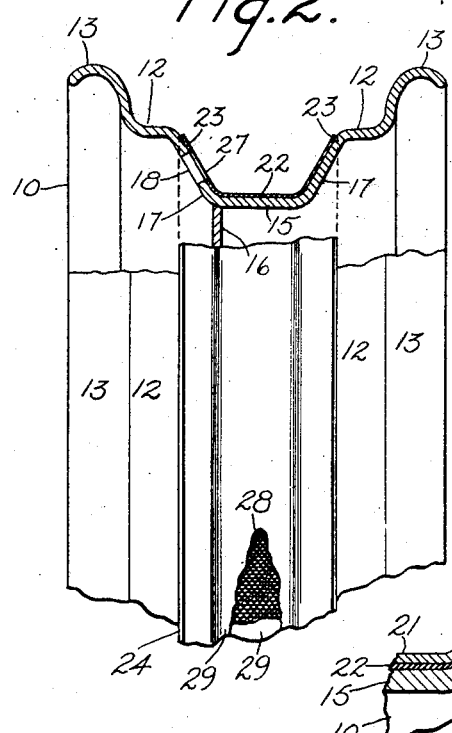
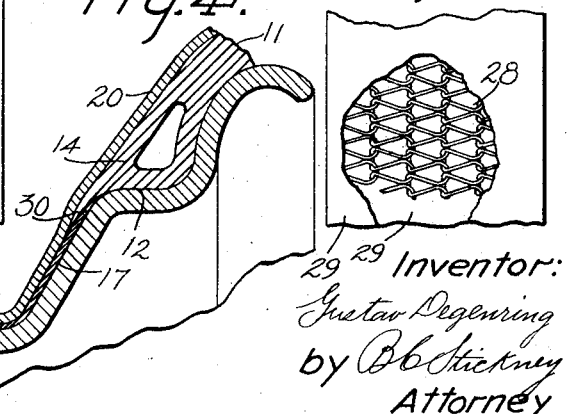
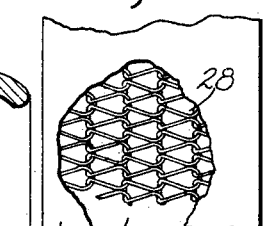

Patented Oct. 12, 1926.

1,602,574

UNITED STATES PATENT OFFICE.

GUSTAV DEGENRING, OF ELIZABETH, NEW JERSEY, ASSIGNOR TO NORTH EASTERN RUBBER COMPANY, OF ELIZABETH, NEW JERSEY, A CORPORATION OF NEW JERSEY.

AUTOMOBILE TIRE.

Application filed November 2, 1925. Serial No. 66,219.

This invention relates mainly to automobile tires and tubes therefor, and particularly to balloon tires and their inner tubes upon "drop center" wheel-rims, in which the tires or shoes are of the so called "straight-side" variety, and in which the tire is attached directly upon an undetachable wheel-rim.

An object of the invention is to avoid wear and injury to the inner tube, which, when expanded in place on the rim, is roughly pear-shaped in cross-section, that is, a substantial portion of the tube is in the form of a trough-like inner annular bead, expanding down between the separated "beads" or edges of the tire or shoe, and filling up the annular channel, groove, gutter or "drop center" of the wheel-rim. Certain features of the invention, however, may be used in connection with other types of tires, rims and inner tubes.

In carrying out the invention in its preferred form, there is provided a facing for the central gutter or "drop" in the wheelrim, whose principal service is to sheathe and therefore prevent injury to the inwardly-protruding bead-like portion of the airtube from injury from any source, such as rust or abrasion. This sheathing or lining is in the form of a channelled band, which preferably is manufactured in flat condition and is stretched around the gutter-portion of the wheel, the sheathing band having sufficient stretch to permit it to be passed over the large outer rim-flanges. In the preferred form of the invention the sheathing band, which performs the duty of the flap of an ordinary tire, is in tensioned condition around the bottom of the rim-gutter; and the sides of the band are still more tensioned, the band being thus self-securing upon the rim.

One of the features of the invention is the provision of means whereby there is insured uniformity of expansion of the sheathing band in use throughout its length, so that the rubber of the band is not subjected to undue stretching at some points and to too little stretching at other points, as is the fault of an ordinary soft rubber band or flap. To distribute the stretch uniformly, the band is provided with a layer of woven fabric, which is not so extensible as the soft rubber layer, but is capable of stretching enough to permit the band to be passed over the large outer flange of the wheel-rim and to permit the band to grip the sides and bottom of the central gutter of the wheel-rim. The highly-distensible soft rubber layer is prevented from overstretching at any point, since that fault is prevented by the moderate or limited expansibility of said fabric layer. Thus serious overstretching does not occur and liability of tearing of the soft rubber, due to undue straining thereof at any point, is eliminated. Moreover a band made of ordinary soft rubber lacks toughness, and hence is liable to be cut by the tire-irons in attaching or detaching the tire, and such cut is liable to develop into a rupture of the band. This difficulty is entirely overcome by the use of the moderately stretchable fabric ply in the band, which not only reduces the tension on the rubber, but also by its own toughness protects the rubber from various injuries.

This fabric ply is preferably in the nature of stockinet, and is faced on both sides with extensible soft rubber of a tough wearable quality. The stockinet is stretchable in only one direction, and that direction is longitudinal of the band. The stockinet has little or no transverse stretch, and hence there is no crosswise stretch of the rubber. This is an advantage in several ways, as, for example, the operation of attaching or placing the band in proper position in the rim-gutter is facilitated.

The sheathing band fills the rim-gutter, extending across from edge to edge of the open inner annular slot in the tire-shoe; and, by reason of its clinging tightly to the bottom and side walls of the rim-gutter, it protects the inner tube of the tire against rust, and moreover cooperates with the shoe to keep water from entering the central depression or gutter in the rim.

Other features and advantages will hereinafter appear. In the accompanying drawings:—

Figure 1 is a perspective view of an extensible annular sheating band or flap, which is shown in other views in place upon the rim of an automobile-wheel.

Figure 2 is a sectional view of the wheel-rim with the annular band stretched thereon.

Figure 3 shows the tire in place upon the wheel, with the inner tube expanded and protected by the annular band.

Figure 4 is a view similar to Figure 3 but showing the inner lips of the tire-shoe overlapping the edges of the annular band.

Figure 5 is a detail of the stockinet insertion forming part of the annular band.

The automobile-wheel rim is designated generally as 10, and is of the type which is acceptable for carrying tires of the balloon type, such tires or shoes being of the so called "straight-side" variety, and having very flexible side walls and great air capacity, for low-pressure service. The tire or shoe 11 fits upon a divided bed, bottom or seat 12, formed between rolled-over side flanges 13. The beads or thickenings 14, bordering the interior annular slot of the tire, rest upon these annular beds 12, which are formed deep within the flanges 13, to prevent accidental dislodgement of the tire from the wheel. This style of wheel-rim is known as "drop center," because it has a deep annular groove or gutter 15 formed between the portions of the divided bed 12. The usual steel wheel-disk 16 is brazed or otherwise secured to the bottom of the gutter 15, which includes sides 17 that diverge from the bottom of the gutter to the inner borders of the bed-portions 12. In one of the inclined sides of the gutter is a perforation 18, for air-valve 19. The inner tube 20 of the tire has along its inner side an annular bead-portion 21, which extends within the gutter 15, 17 of the rim. Said gutter 15, 17 is a convenience in attaching and detaching the tire, as is well known to those skilled in the art. One bead 14 of the tire is first placed upon the wheel, and then the inner tube 20 is inserted, then the other bead 14 is put in place, and then the inner tube is blown up.

Prior to mounting the tire and inner tube upon the wheel-rim, there is stretched over the rim and into the annular gutter 15 an annular extensible soft sheathing band 22, which conforms itself to the side walls and bottom of the gutter, and sheathes the inner tube-portion 21 from abrasion, cutting or other injury, and also shields the tube from any rust which may gather on the rim. This sheathing 22 is distended along its annular diverging sides 23, and also along its annular bottom-portion 22, so that the sheathing holds itself effectively to the inner surface of the gutter 15, 17 of the wheel-rim. After the sheathing is in place, as at Figure 2, the shoe 11 and the inner tube 20 are put in place upon the wheel, as at Figure 3, and all of that portion of the tube 20 that is below the tire-beads 14 is sheathed by the band 22, which keeps the tube entirely out of contact with the rim.

The sheathing is marketable before placing upon the wheel-rim, and may be in the form of a band 24, seen at Figure 1, formed by a strip of flat, soft, distensible rubber whose ends are joined at 25, this portion of the band having a reinforcement 26 of strong soft fabric; and at one side wall of the band, in the reinforced region therein, is a perforation 27 for the air-valve, in position to register with the perforation 18 in the side of the wheel-rim.

One of the features of the invention is the provision of means for avoiding placing any portion of the rubber sheathing under excessive tension, and thereby rendering it oversensitive to injury from abrasion and cutting. Uneven tension of the rubber is guarded against by the use of a ply of fabric 28, this being a cloth insertion, since it is faced on both sides with soft rubber 29. This fabric is made of a material, such, for example, as stockinet, which will stretch longtudinally of the sheathing or band, that is, in a direction around the wheel-rim, but does not stretch laterally or across the sheathing. By the use of this layer of extensible fabric, it is insured that the rubber shall be of substantially uniform tension entirely around the wheel, and therefore long-lived and uniformly serviceable. The stockinet has little, if any, stretch in a direction transversely of the band, which conduces to quick and even placing of the sheathing upon the wheel, and is otherwise advantageous. The stockinet is sufficiently elastic to permit the sheathing to be stretched over the outer flange 13 of the wheel-rim, and to tighten itself into the gutter 15, 17, and to remain in such distended condition throughout its length, assuring efficiency and constant tight fitting of the sheathing.

From the inner edge of each tire-bead 14 extends an annular lip-portion 30, which overlaps the gutter-sides 17, 17, and prevents the inner tube 20 from being pinched between the shoe-bead 14 and the rim-seat 12. The sheathing 22 may be wide enough to reach from one lip 30 to the lip 30 on the opposite bead 14 of the tire, as at Figure 3. The lips may, however, be thinned down gradually each to an edge as at Figure 4, and overlap both side edges of the sheathing 22, aiding in the protection of the tube and still better excluding water from access to the gutter 15, 17 of the wheel-rim.

Variations may be resorted to within the scope of the invention, and portions of the improvements may be used without others.

Having thus described my invention, I claim:—

1. The combination with a flanged automobile-wheel rim, a pneumatic tire thereon open along its inner face, and a soft tube expanded within said tire, of a sheathing upon said rim for protecting said inner tube, said sheathing in the form of a soft rubber endless band, said band being reinforced by stockinet which is stretchable longitudinally of the band.

2. The combination with a flanged automobile-wheel rim having in its bottom a gutter, of a slotted pneumatic tire secured upon the rim and having separated beads along the edges of its slot, an inner tube filling the tire and expanded down between the tire beads to fill said gutter, and a soft rubber sheathing upon the bottom and sides of said gutter and protecting the tube from injury, said sheathing extending across the gutter from edge to edge of the slot in the tire. said tire beads provided with lips extending into said gutter, said lips extending down inside of and overlapping said sheathing.

GUSTAV DEGENRING.